(12) United States Patent
Tian

(10) Patent No.: US 8,087,867 B2
(45) Date of Patent: Jan. 3, 2012

(54) LOADING/UNLOADING SYSTEM FOR CONTAINER TERMINAL

(75) Inventor: Hong Tian, Shanghai (CN)

(73) Assignee: Shanhai Zhenhua Port Machinery Co. Ltd., Shanghai (CN)

( * ) Notice: Subject to any disclaimer, the term of this patent is extended or adjusted under 35 U.S.C. 154(b) by 356 days.

(21) Appl. No.: 12/356,113

(22) Filed: Jan. 20, 2009

(65) Prior Publication Data
US 2009/0191028 A1 Jul. 30, 2009

(30) Foreign Application Priority Data
Jan. 24, 2008 (CN) .......................... 2008 1 0032993

(51) Int. Cl.
*B66C 19/00* (2006.01)
*B65G 63/00* (2006.01)

(52) U.S. Cl. ............... 414/141.3; 414/139.9; 414/140.1; 414/140.3; 212/318; 212/325; 212/326

(58) Field of Classification Search ............... 414/139.4, 414/139.9, 140.3, 141.3; 212/318
See application file for complete search history.

(56) References Cited

U.S. PATENT DOCUMENTS

| | | | |
|---|---|---|---|
| 3,051,321 A * | 8/1962 | Ramsden | .................... 212/318 |
| 3,075,479 A | 1/1963 | Goby | |
| 3,247,974 A | 4/1966 | Dechantsreiter | |
| 3,502,365 A | 3/1970 | Callow | |
| 3,536,351 A | 10/1970 | Zweifel et al. | |
| 3,559,822 A | 2/1971 | Lichtenford | |
| 3,671,069 A | 6/1972 | Martin et al. | |
| 3,689,106 A | 9/1972 | Yong | |
| 3,700,128 A | 10/1972 | Noble et al. | |
| 3,704,796 A | 12/1972 | Dedons et al. | |
| 3,747,970 A | 7/1973 | Fathauer et al. | |
| 3,754,669 A | 8/1973 | Aslen | |
| 3,788,606 A | 1/1974 | Solter | |
| 3,807,582 A | 4/1974 | Anderson | |
| 3,812,987 A | 5/1974 | Watatani | |
| 3,837,503 A | 9/1974 | Komatsu | |
| 3,888,536 A | 6/1975 | Durenec | |
| 4,244,615 A | 1/1981 | Brown | |
| 4,431,368 A | 2/1984 | Katz et al. | |

(Continued)

FOREIGN PATENT DOCUMENTS

CN    2225462    4/1996

(Continued)

*Primary Examiner* — Gregory Adams
(74) *Attorney, Agent, or Firm* — Dorsey & Whitney LLP

(57) ABSTRACT

Embodiments of the present invention include quayside cranes and yard cranes related by a low elevated transfer system and a ground transportation carrier system. The low elevated transfer system includes low elevated transfer sub-systems having low elevated rails, the low elevates rails include low elevated crane rails and low elevated flat carrier rails, low elevated cranes are disposed on the low elevated crane rails and low elevated flat carriers are disposed on the low elevated flat carrier rail. The ground transportation carrier system includes ground transportation carrier rails and transportation carriers moving along the ground transportation carrier rails. Embodiments of the present invention transport the containers by rails and use municipal electric as the power supply. A three-dimensional low elevated transfer system and a ground transportation carrier system are provided to implement three-dimensional transportation of containers. Embodiments of the present invention provide a container transportation schema that is efficient, power saving, environmental and automatic, ground resources are utilized with high efficiency. The present invention is an expansion and development of the invention provided in CN 200510111464.0.

10 Claims, 12 Drawing Sheets

U.S. PATENT DOCUMENTS

| | | | |
|---|---|---|---|
| 4,563,030 A | 1/1986 | Makino | |
| 4,682,926 A | 7/1987 | Chambers et al. | |
| 4,755,099 A | 7/1988 | Belveal | |
| 4,927,034 A | 5/1990 | Holden | |
| 4,950,114 A | 8/1990 | Borchardt | |
| 4,973,219 A | 11/1990 | Brickner et al. | |
| 4,995,783 A | 2/1991 | Petitto et al. | |
| 5,039,275 A | 8/1991 | Ide | |
| 5,183,305 A | 2/1993 | Nordstrom et al. | |
| 5,671,912 A | 9/1997 | Langford et al. | |
| 5,718,550 A | 2/1998 | Lanigan, Sr. et al. | |
| 5,775,866 A | 7/1998 | Tax et al. | |
| 5,871,249 A | 2/1999 | Williams | |
| 5,923,270 A | 7/1999 | Sampo et al. | |
| 5,951,226 A | 9/1999 | Fantuzzi | |
| 6,145,680 A | 11/2000 | Jussila et al. | |
| 6,243,649 B1 | 6/2001 | Wetherbee et al. | |
| 6,312,213 B1 | 11/2001 | Stinis | |
| 6,354,782 B1 | 3/2002 | Barry | |
| 6,554,121 B1 | 4/2003 | Halbesma | |
| 6,602,036 B2 | 8/2003 | Takehara et al. | |
| 6,698,990 B1 | 3/2004 | Dobner et al. | |
| 6,715,977 B2 | 4/2004 | Dobner et al. | |
| 6,920,963 B2 | 7/2005 | Faller | |
| 7,032,763 B1 | 4/2006 | Zakula, Sr. et al. | |
| 7,213,852 B2 | 5/2007 | Zhu | |
| 7,270,312 B1 | 9/2007 | Phipps | |
| 7,284,744 B1 | 10/2007 | Lerchenmueller et al. | |
| 7,461,832 B2 | 12/2008 | Zhang | |
| 7,494,020 B2 | 2/2009 | Shan et al. | |
| 7,556,161 B2 | 7/2009 | Shan et al. | |
| 7,686,558 B2 * | 3/2010 | Tian et al. | 414/139.9 |
| 2002/0044854 A1 | 4/2002 | Franzen et al. | |
| 2003/0168871 A1 | 9/2003 | Geis | |
| 2003/0189348 A1 | 10/2003 | Lindstrom | |
| 2004/0032140 A1 | 2/2004 | Solstad | |
| 2005/0033514 A1 | 2/2005 | Lu | |
| 2005/0036854 A1 | 2/2005 | Takehara | |
| 2006/0043748 A1 | 3/2006 | Stinis et al. | |
| 2006/0045659 A1 * | 3/2006 | Hubbard | 414/139.4 |
| 2006/0243724 A1 | 11/2006 | Shan | |
| 2007/0090075 A1 | 4/2007 | Tian | |
| 2007/0134076 A1 | 6/2007 | Tian | |
| 2007/0176490 A1 | 8/2007 | He et al. | |
| 2007/0217894 A1 | 9/2007 | Tian et al. | |
| 2007/0248444 A1 | 10/2007 | Tian et al. | |
| 2008/0048497 A1 | 2/2008 | Donnelly et al. | |

FOREIGN PATENT DOCUMENTS

| | | | |
|---|---|---|---|
| CN | 1155664 | | 7/1997 |
| CN | 2628508 | | 7/1997 |
| CN | 2373421 | | 4/2000 |
| CN | 1415529 | | 5/2003 |
| CN | 1448331 | | 10/2003 |
| CN | 2599327 | | 1/2004 |
| CN | 1579916 | | 2/2005 |
| DE | 1274299 | B | 8/1968 |
| DE | 38 38 058 | A1 | 5/1990 |
| EP | 302569 | | 2/1989 |
| EP | 1 650 156 | A | 4/2006 |
| EP | 1798169 | A2 * | 6/2007 |
| FR | 828297 | A | 5/1938 |
| GB | 876647 | | 9/1961 |
| JP | 55-035722 | A | 3/1980 |
| JP | 60153331 | | 8/1985 |
| JP | 01294121 | | 11/1989 |
| JP | 05097251 | | 4/1993 |
| JP | 8 175784 | A | 7/1996 |
| JP | 09-77467 | | 3/1997 |
| JP | 9-267987 | | 10/1997 |
| JP | 10-265717 | | 10/1998 |
| JP | 10310368 | A * | 11/1998 |
| JP | 10-324493 | | 12/1998 |
| JP | 2001/240372 | A | 9/2001 |
| JP | 2002068481 | | 3/2002 |
| WO | WO 98/34127 | | 8/1998 |
| WO | WO 01/58797 | A1 | 8/2001 |
| WO | WO 01/98195 | | 12/2001 |
| WO | WO 2005/009885 | A1 | 2/2005 |
| WO | WO 2005/120883 | | 12/2005 |

* cited by examiner

LOADING/UNLOADING SYSTEM FOR CONTAINER TERMINAL

FIELD OF THE INVENTION

Embodiments of the present invention relates to container loading/unloading technique for a container terminal, more particularly, relates to a loading/unloading system for efficiently transfer a container between a certain position on a ship and a certain position on a terminal.

BACKGROUND

With the blooming demand for container transportation all over the world and the growth in throughput of container terminals, requirements on container loading/unloading device and process is also improved. There is a need for a new container loading/unloading device and system that has higher efficiency, so as to meet the requirements on loading/unloading production efficiency of a terminal for a scaled, speed and automatic transportation of containers.

From 1990s, with the development of the world economic and trade, the amount of transportation of containers increases, new techniques, especially automatic control techniques of quayside container cranes develop quickly. However, loading/unloading systems that are currently used for a container terminal still have the following problems.

Generally, a container terminal may be divided into a front area (a quayside area) and a rear area (a yard area) and a middle area. Quayside cranes located in the front area load/unload containers with a container ship, a yard at the rear area is used to stack containers. Trucks are used to transport containers between the front area and the rear area.

For transportation between the quayside cranes and the yard, nowadays, plane trucks driven by diesel engine are used to achieve transportation between a front area and a rear area. For an unloading process, the quayside cranes unload containers from a ship to the plane trucks, the plane trucks transport the containers to a yard, then yard cranes hoist the containers from the plane trucks and put them on the yard. For a loading process, the yard cranes hoist containers from the yard and put them on plane trucks, the plane trucks transport the containers to a position below the quayside cranes, the quayside cranes load the containers to the ship. Attempts are made for an automatic loading/unloading process for containers, for example, Port of Rotterdam in Netherlands and Hamburger Harbor in Deutschland introduce Automatic Guided Vehicles (AVG) to replace the plane trucks driven by drivers. AGVs are still driven by diesel engine, there is no improvement in energy source. Additionally, AGVs are very expensive, and must move along a single guide line which is buried in advance in a same plane. If one of the AGVs is failed, the whole system is stopped. Unfortunately, failure possibility of AGVs is very high because of the complex structure, failures of AGVs are also difficult to deal with. Therefore, the current attempts of automatic systems face a low efficiency and a high cost.

Whatever the traditional manual manner, or the automatic attempts, the loading/unloading mode of containers can be concluded as: a plane transportation mode consists of quayside cranes located at a quayside area of a container terminal, yard cranes located at a yard area of the container terminal, and diesel engine driven vehicles, such as container trucks, cross transportation trucks, AGVs moving between the quayside cranes and the yard cranes for transporting the containers. The loading/unloading mode needs dozens or even hundreds of diesel engine driven vehicles, for ensuring a smooth movement of these vehicles, a large space must be reserved between the quayside and the yard, which occupies a considerable size of ground. Even a large space is provided, the traffic within the container terminal is still very crowd because all of the vehicles move in a same plane. The vehicles work in a low efficiency, not being able to timely transport containers, and decrease the loading/unloading efficiency of the whole container terminal. Efficiency of vehicles becomes a bottle-neck of loading/unloading efficiency of the container terminal. Furthermore, oil is expensive, operation cost of the container terminal is high and benefit of the container terminal is getting lower. Another problem is, burning oil produces a large amount of exhaust gas and noise, seriously pollute the environment. Maintenance fee of the diesel engine driven vehicles is also very high. The plane transportation technique falls behind, and can not facilitate infomationization, automation and intelligentization of the container terminal.

SUMMARY

Embodiments of the present invention provide a new loading/unloading system for container terminal, by using the new system, traditional plane transportation mode is changed to be a three-dimensional transportation mode, diesel engines are replaced with electric power supply, rails are also provided to guide the transportation. Embodiments of the present invention achieve an automatic transportation process of loading/unloading, transferring and stacking containers, which is high efficient, power saving, speedy, accurate and environmental.

Embodiments of the present invention provide a new loading/unloading system for container terminal, including a three-dimensional low elevated transfer system located between quayside cranes and yard cranes, and cooperating with a ground transportation carrier system. The low elevated transfer system includes at least one low elevated transfer subsystem, each subsystem includes at least one group of low elevated rails disposed along a first direction. Each group of low elevated rails includes a low elevated crane rail and a low elevated flat carrier rail. At least one low elevated crane is disposed on the low elevated crane rail and moves along the low elevated crane rail, at least one low elevated flat carrier is disposed on the low elevated flat carrier rail and moves along the low elevated flat carrier rail. The low elevated rails are configured to enable the low elevated flat carriers and the low elevated cranes to reach at least a position where the low elevated cranes can cooperate with trolleys of the quayside cranes and a position where the low elevated cranes can cooperate with the ground transportation carriers. The low elevated cranes may load/unload containers on/off a low elevated flat carrier and a corresponding ground transportation carrier ay any necessary place. The low elevated place carriers may move to a certain position associated with a certain quayside crane and a certain position associated with a certain ground transportation carrier. The ground transportation carrier system includes at least a group of transportation carrier rails disposed along a second direction, which align to passages in the yard and extend to a necessary position in the yard. The transportation carrier rails also extend to a position below the lowest tier of the low elevated transfer subsystem in the low elevated transfer system. The ground transportation carrier system further includes ground transportation carriers moving along the ground transportation carrier rails. The ground transportation carrier rails are configured to enable the ground transportation carriers to reach at least a position where the ground transportation carriers can cooperate with the low elevated cranes and a position where the ground transportation carriers can cooperate with the yard cranes. The ground transportation carrier rails are further configured to ensure that the ground transportation carriers are not in the same plane with any low elevated flat carriers on any tier of the low elevated transfer system. One of ground transportation carrier or the low elevated crane has an ability to rotate to an angle between the first direction and the second direction with or without a container. The ground transportation carrier rails may be configured to extend to an end of the yard rather than entering into the yard, or be configured to extend into a deep position in the yard or extend though the yard.

In a loading process, a yard crane hoists a container in the second direction from a yard, the yard crane moves to a position above a ground transportation carrier along a yard crane rail or the ground transportation carrier moves to a position below the yard crane along a ground transportation carrier rail, the yard crane puts the container onto the ground transportation carrier and the ground transportation carrier moves along the ground transportation carrier rail to a position below a low elevated rail of the low elevated transfer system, the round transportation carrier or a low elevated crane rotates the container from the second direction to the first direction, the low elevated crane hoists the container from the ground transportation carrier to a low elevated flat carrier, the low elevated flat carrier moves along the low elevated flat carrier rail to a position below a quayside crane, the quayside crane hoists the container from the low elevated flat carrier to the ship. In a unloading process, a quayside crane hoists a container in the first direction from a ship and puts the container onto a low elevated flat carrier, the low elevate flat carrier moves along a low elevated flat carrier rail to a position that can cooperate with a ground transportation carrier, a low elevated crane hoists the container to a ground transportation carrier, the low elevated crane or the ground transportation carrier rotates the container from the first direction to the second direction, the ground transportation carrier moves along a ground transportation carrier rail to a yard, a yard crane hoists the container from the ground transportation carrier to the yard.

Embodiments of the present invention implement a railed transportation that uses municipal electricity as power supply, thus the problems such as pollution (exhaust gas and noise) caused by diesel engine driven vehicles (trucks, AGVs, cross-transportation vehicles) can be solved. Embodiments of the present inventions provide a better profit for the container terminals, and facilitate informationization, automation and intelligentization of the container terminals. The three-dimensional low elevated transfer system and the ground transportation carrier system used in embodiments of the present invention also overcome the drawbacks such as low efficiency and poor safety of the traditional plane transportation system, the speed and efficiency of transportation between the quayside cranes and the yard cranes are greatly increased. Furthermore, the three-dimensional low elevated transfer system reduces the distance considerably between the quayside cranes and the yard cranes, so that more space can be used to stack containers and the ground is sufficiently utilized. Rotation of the containers is solve by using a rotatable transportation carrier or a rotatable low elevated crane. A whole schema of the present invention is proper for an automatic container terminal. Embodiments of the present invention have an advantage of high load/unload efficiency, and provide a new production mode for load/unload process of a container terminal.

BRIEF DESCRIPTION OF THE DRAWING(S)

The above or other features, natures or advantages of the present invention will be more apparent to the skilled person in the art by the following descriptions of the embodiments accompanying with the drawings, the same sign reference indicates the identical features throughout the description, and wherein:

FIG. 1b is a side view of FIG. 1a;

FIG. 2b is a side view of FIG. 2a;

FIG. 3b is a side view of FIG. 3a;

FIG. 4b is a side view of FIG. 4a;

FIG. 5b is a side view of FIG. 5a;

FIG. 6b is a side view of FIG. 6a;

DETAILED DESCRIPTION

Main concept of embodiments of the present invention is to provide a three-dimensional low elevated transfer system and a ground transportation system between quayside cranes and yard cranes, utilize electric driven flat carriers (including low elevated flat carriers and ground transportation carriers) being disposed on rails with different height and moving there along and cranes (low elevated cranes) working between the rails with different height to realize transportation of containers between a certain place on a ship and a certain place in a yard. The electric driven flat carriers can move along the rails in both directions and transport the containers from one end to the other end. A rotation platform on the ground transportation carrier or a rotation mechanism on the low elevated crane can rotate clockwise or counterclockwise with or without the container, thus the containers may be arranged in different directions in the ship and in the yard.

Based on the above concept, embodiments of the present invention provide a low elevated transfer system, a ground transportation carrier system, and also provide quayside cranes and yard cranes that are connected by the low elevated transfer system and the ground transportation carrier system, so as to implement high efficient transportation of containers.

In the following descriptions, for the purpose of clarity, a first direction refers to a direction that the containers are arranged in a ship, a second direction refers to a direction that the containers are arranged in a yard, the first direction is perpendicular to the second direction.

Loading/Unloading System for Container Terminal

Figure 1A:
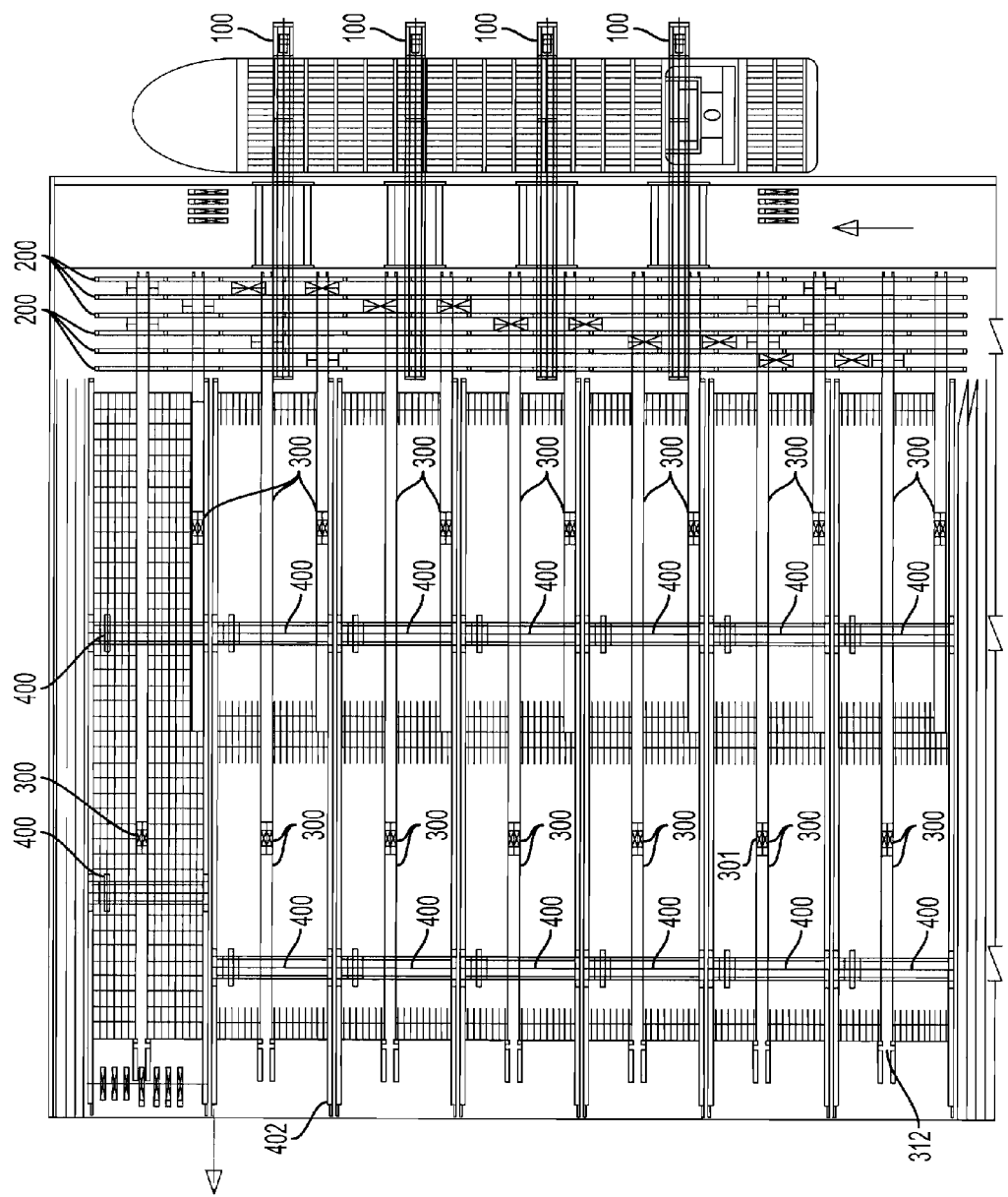
FIG. 1a is a top view of a loading/unloading system according to a first embodiment of the present invention.
Figure 1B:
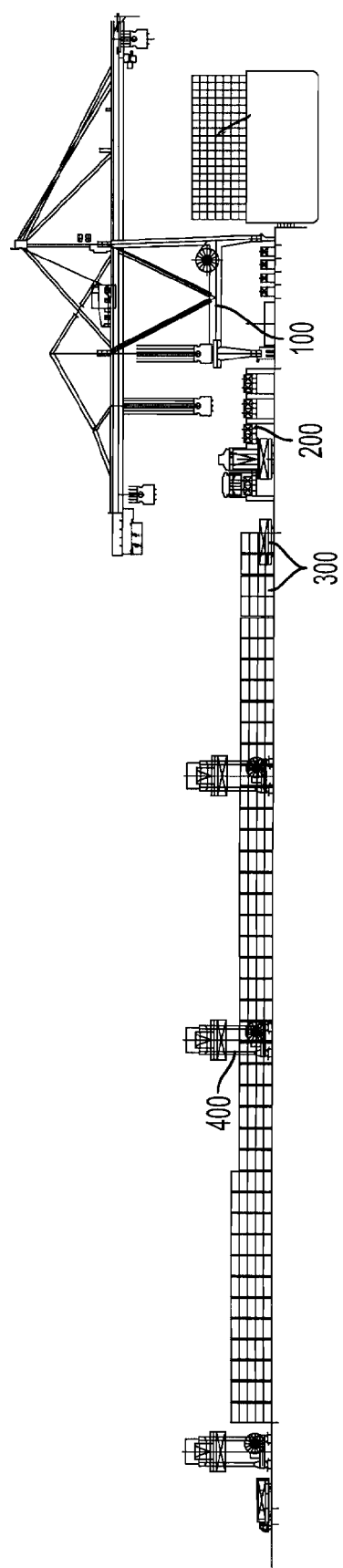

Embodiments of the present invention provide a loading/unloading system for a container terminal in which containers are arranged in perpendicular directions in a ship and in a yard. Referring to FIGS. 1a and 1b, a first schema of the loading/unloading system for a container terminal is shown.

The system includes a plurality of quayside cranes 100. A quayside crane 100 includes at least a travelling mechanism 101, a trolley 102, and a hoisting mechanism 103. The quayside crane 100 is operable for loading/unloading containers on/off a ship, and loading/unloading containers on/off a low elevated transfer system 200. The containers in the ship are arranged in the first direction and the containers hoisted by the quayside crane 100 are kept in the first direction. The trolley 102 on the quayside crane 100 moves along the second direction, which is perpendicular to the first direction. It should be noted that a rail of the trolley 120 extends to a position over low elevated rails 202 of the low elevated transfer system 200 and covers all of the low elevated rails 202, so that the trolley 102 can load/unload of containers on/off any low elevated flat carriers 206 of the low elevated transfer system 200. FIGS. 1a and 1b illustrate a quayside crane 100 having a single trolley for hoisting two 40 feet containers as an example. For a quayside crane having two trolleys, the present invention may be realized through a reasonable arrangement of the rails of the two trolleys, which can be forecasted by one of the ordinary skilled in the art.

The system also includes a low elevated transfer system 200 (which will be further described in detail below). The low elevated transfer system 200 includes at least one low elevated transfer subsystem. Each low elevated transfer subsystem has a low elevated structure 202 and supports 201. At least one group of low elevated flat carrier rails 203 is disposed along the first direction, and at least one low elevated flat carrier 206 is disposed on each group of the low elevated flat carrier rails 203 and moves there along. At least one group of low elevated crane rails 204 is disposed along the first direction, and at least one low elevated crane 205 is disposed on each group of the low elevated crane rails 204. The low elevated crane 205 loads/unloads containers on/off the low elevated flat carrier 206 and ground transportation carrier 301. The low elevated flat carrier rails are configured to enable the low elevated flat carriers 206 to reach at least a position where the low elevated flat carriers 206 can cooperate with the trolley 102 of the quayside crane 100 and a position where the low elevated flat carriers 206 can cooperate with the ground transportation carrier 301. Scale of the low elevated transfer system 200, that is, the number of the low elevated transfer subsystems is determined based on the number of berths in the container terminal, the number of quayside cranes and the number of yards. On each group of low elevated crane rails 204, one or two low elevated cranes 205 may be provided, the low elevated cranes 205 move in both directions along the low elevated crane rails 204. Similarly, on each group of low elevated flat carrier rails 203, one or two low elevated flat carriers 206 may be provided. When two low elevated flat carriers 206 are provided on each group of low elevated flat carrier rails 203, the two low elevated flat carriers 206 are used for transportation of containers in a left side and a right side of the quayside crane 100 respectively. According to embodiments of the present invention, a plurality of low elevated structures can be stacked (which will be described in detail below). The low elevated flat carriers 206 and the low elevated cranes 205 may move along the low elevated flat carrier rails 203 and the low elevated crane rails 204, which are disposed in the first direction to a position that is desired. It should be noted that, all of the low elevated cranes 205 and low elevated flat carriers 206 shall be arranged in a position that can be reached by the trolley 102 of the quayside crane. That is, all of the low elevated cranes 205 and low elevated flat carriers 206 shall be arranged in an area below the rail of the trolley 102 of the quayside crane and above the ground transportation rails of the ground transportation carrier 301. In an embodiment, the low elevated transfer system 200 further includes a backup low elevated transfer subsystem. When the load/unload operation is busy, or a yard is so far away that the transportation speed of the low elevated transfer system and the ground transportation carrier system can not keep up with the loading/unloading speed of the quayside cranes, or one of the low elevated transfer subsystem is failed, the backup low elevated transfer subsystem can be used to maintain the production efficiency of the whole container terminal.

The loading/unloading system further includes a ground transportation carrier system 300. The ground transportation carrier system 300 includes at least one group of ground transportation carrier rails 302. The ground transportation carrier rails 302 align to passages of the yard and extend to a desired position in the yard (according to the illustrated embodiment, two groups of ground transportation carrier rails are provided, one group extends through the yard and the other ground extends into the yard). The ground transportation carrier rails 302 also extend to a position below the lowest tier of the low elevated structure (if a multi-tier low frame structure is provided) in the low elevated transfer system 200. The ground transportation carrier system 300 further includes a ground transportation carrier 301 moving along the ground transportation carrier rails 302. According to an embodiment of the present invention, one of the ground transportation carrier 301 or the low elevated crane 205 has an ability to rotate to an angle between the first direction and the second direction with or without a container. According to an embodiment, the low elevated crane 205 performs the 90° rotation. In an implementation, it would be sufficient when one of the two devices had the ability to rotate. If a low elevated crane 205 that has the ability to rotate is used, then the ground transportation carrier 301 may not need the rotation ability. Similarly, if a low elevated crane 205 that does not have the ability to rotate is used, the ground transportation carrier 301 may rotate the container which is carried by it. Structure of the ground transportation carrier 301 will be described in detail below. The ground transportation carrier rails 302 are configured to enable the ground transportation carriers 301 to reach at least a position where the ground transportation carriers 301 can cooperate with the low elevated cranes 205 and a position where the ground transportation carriers 301 can cooperate with the yard cranes 400. The ground transportation carrier rails 302 are further configured to ensure that the ground transportation carriers 301 are not in the same plane with any low elevated flat carriers on any tier of the low elevated transfer system 200 so as to avoid a collision between the ground transportation carriers 301 and the low elevated flat carriers 206. The ground transportation carrier system 300 establishes a connection between the low elevated transfer system 200 and the yards.

In a loading process, a yard crane 400 hoists a container and puts it onto a ground transportation carrier 301. The yard crane 400 may move to a position above a ground transportation carrier 301 along a yard crane rail, or the ground transportation carrier 301 may move to a position below the yard crane 400 along a ground transportation carrier rail 302 (it is preferred that the ground transportation carrier 301 rather than the yard crane 400 moves, so as to avoid a movement of the large yard crane 400 with the containers). In an embodiment, one group of the ground transportation carrier rails extend through the yard and another group of ground transportation carrier rails extend into the yard. After the yard crane 400 puts the container onto the ground transportation carrier 301, the ground transportation carrier 301 moves along the ground transportation carrier rails 302 to a position below the low elevated transfer system 200. The containers in the low elevated transfer system 200 are in the first direction, that is, the direction of the container in the low elevated transfer system 200 is different with the direction of the containers on the ground transportation carrier 301 (in an embodiment, a difference is 90°). The ground transportation carrier 301 rotates 90° with the container and then the low elevated crane 205 hoists the container. According to an embodiment, the ground transportation carrier 301 does not rotates and the low elevated crane 205 rotates 90° during the hoisting process, either in clockwise or counterclockwise so as to make the container to be in the first direction. Then the low elevated crane 205 hoists the container from the ground transportation carrier to the low elevated flat carrier 206, the low elevated flat carrier 206 moves along the low elevated flat carrier rail 203 to a position below the quayside crane. The quayside crane hoists the container from the low elevated flat carrier to the ship.

For the unloading process, just perform the above process in a reverse order and will not be described in detail here. It should be noted that the yard crane 400 has a travelling mechanism 401 moving along the second direction, a trolley 402 moving along a direction perpendicular to the second direction and a hoisting mechanism 403 moving in a vertical direction. The containers are arranged in a second direction in the yard. The travelling mechanism 401 of the yard crane 400 enables the yard crane to move to at least a position that can connect with the ground transportation carrier 301 and a desired position in the yard. In an embodiment, when the ground transportation carrier rails 302 extend to the passages in the yard and go through the yard, the transportation of containers between the yard and the ground transportation carrier system is mainly achieved by the ground transportation carriers 301.

Quayside Crane

For the quayside crane shown in FIGS. 1a and 1b, it could be any existent quayside crane. The quayside cranes are used to load/unload containers on/off a ship, and on/off the low elevated transfer system. The applicant of the present application has also proposed several applications on the quayside cranes, all of these quayside cranes may be applied to the whole schema of the container terminal that is provided according to the present invention.

Figure 2A:
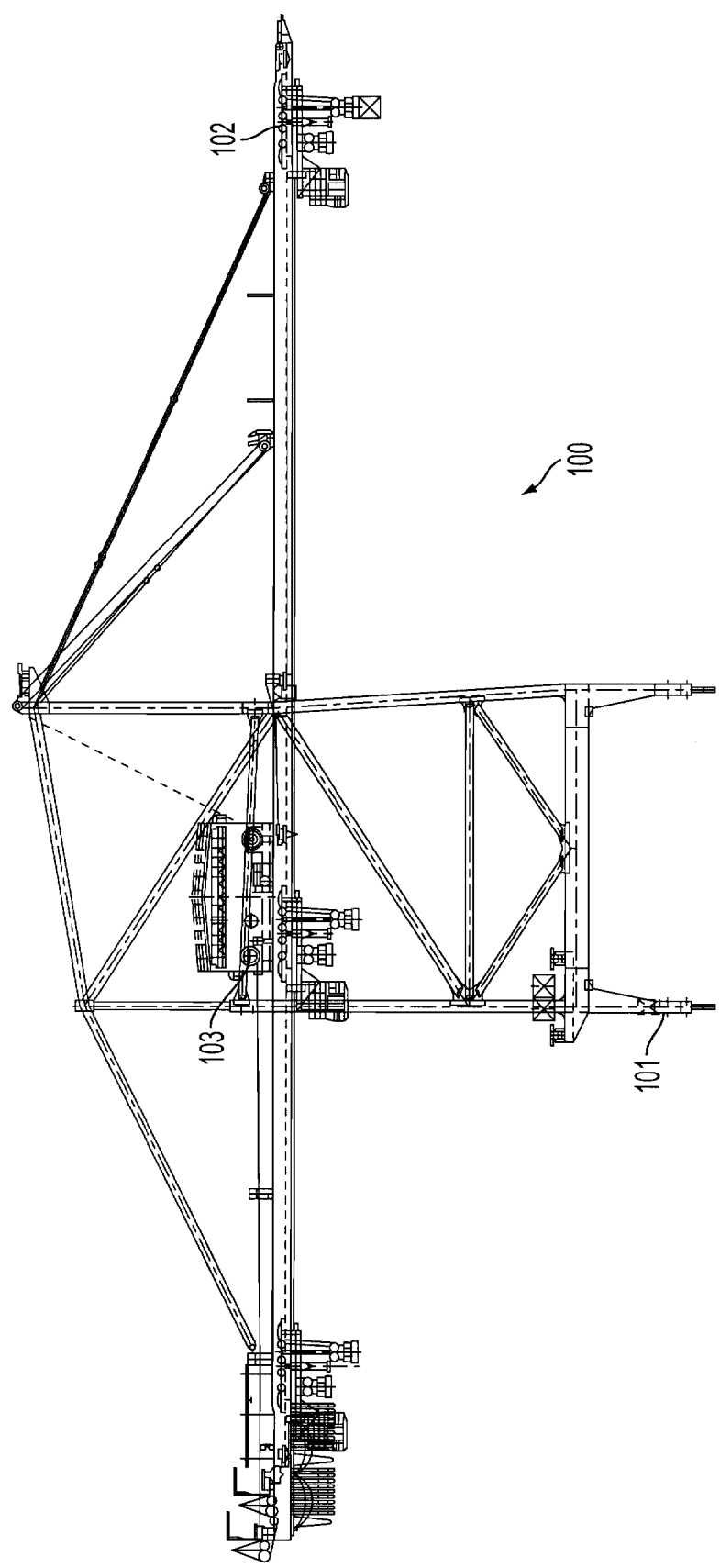
FIG. 2a is a structural diagram of a quayside crane according to an embodiment of the present invention.
Figure 2B:
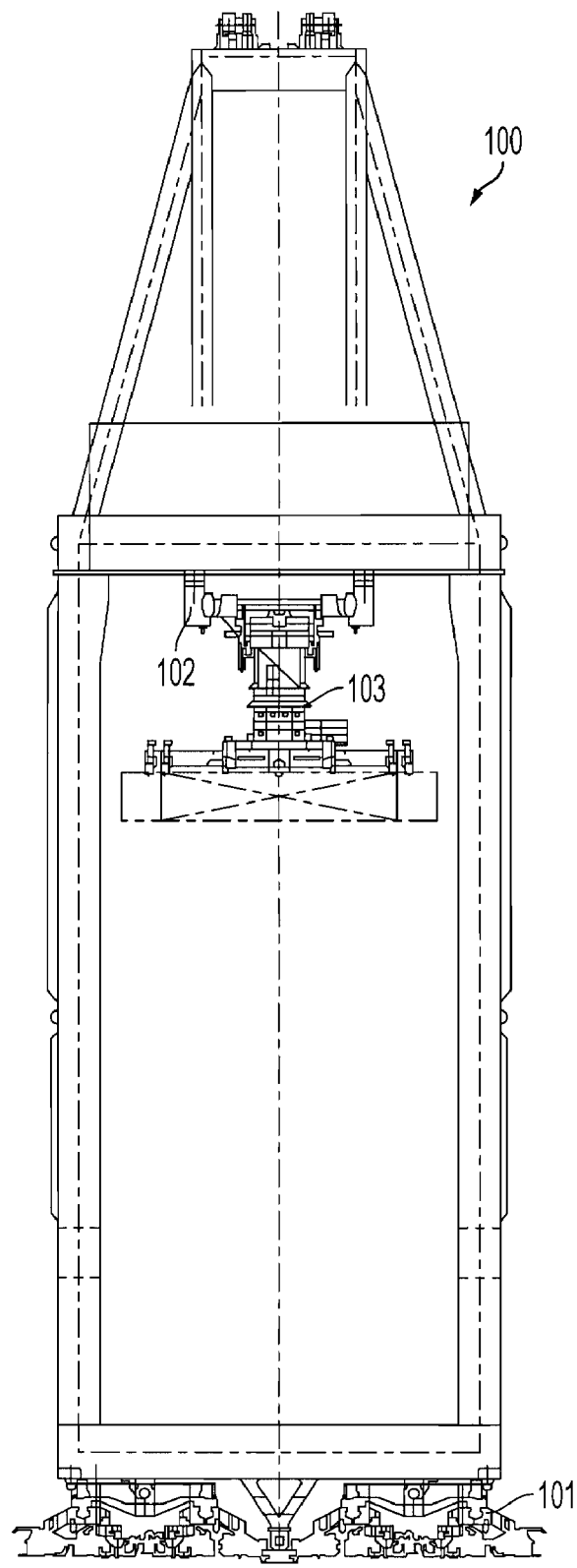

As shown in FIGS. 2a and 2b, a quayside crane for hoisting two 40 feet containers is illustrated as an example. The quayside crane 100 includes a traveling mechanism 101, which drives the quayside crane 100 to move along the quayside. The quayside crane 100 includes a trolley 102 moving along a trolley rail to a position for loading/unloading on/off the ship and a position for loading/unloading on/off the low elevated transfer system. The quayside crane 100 further includes a hoisting mechanism 103 for loading/unloading containers at different heights.

For the purpose of increasing the production efficiency and automatic level, a quayside crane having two trolleys, which is also proposed by the applicant of the present invention may also be applied to the loading/unloading system of the present invention.

Furthermore, a quayside crane for simultaneously hoisting two 40 feet containers, which is also proposed by the applicant of the present invention may be applied to the loading/unloading system of the present invention. If such a quayside crane is used, the corresponding low elevated flat carriers 206, ground transportation carriers 301, low elevated cranes 205, and yard cranes 400 shall also have the ability to process two 40 feet containers simultaneously, so that a best efficiency can be achieved.

And, a quayside crane having two trolleys and can hoist two 40 feet containers simultaneously may also be applied to the loading/unloading system of the present invention.

High efficient quayside cranes can increase the whole production efficiency of the container terminal, however, it should be noted that any existent quayside cranes or any new quayside cranes that will be developed can be applied in the loading/unloading system of the present invention. Embodiments of the present invention are focused on the whole loading/unloading system, not just a particular component, such as the quayside crane in the system.

Low Elevated Transfer System

The low elevated transfer system includes at least one low elevated transfer subsystem, each including at least one group of low elevated rails disposed along the first direction. Each group of the low elevated rails includes low elevated flat carrier rails and low elevated crane rails. At least one low elevated crane is disposed on and moving along one low elevated rail, at least one low elevated flat carrier is disposed on and moving along one low elevated flat carrier rail. The low elevated crane performs load/unload to a low elevated flat carrier and a corresponding ground transportation carrier, the low elevated flat carrier rails are configured to enable the low elevated flat carriers to reach at least a position where the low elevated flat carriers can cooperate with trolleys of the quayside cranes and a position where the low elevated flat carriers can cooperate with the corresponding ground transportation carriers.

Figure 3A:
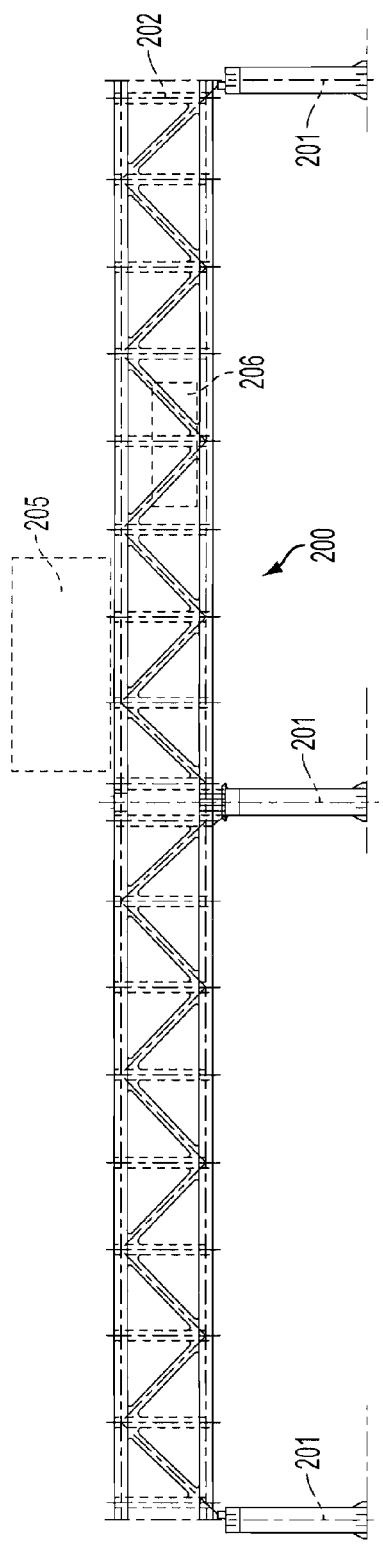
FIG. 3a is a structural diagram of the structure of a low elevated transfer subsystem in a low elevated transfer system according to an embodiment of the present invention.
Figure 3B:
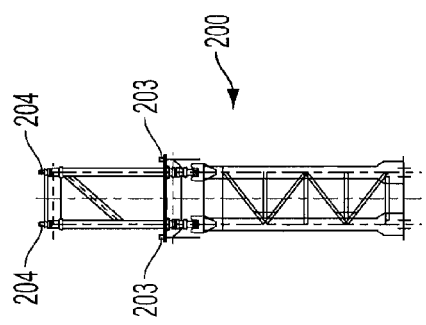
Figure 3C:
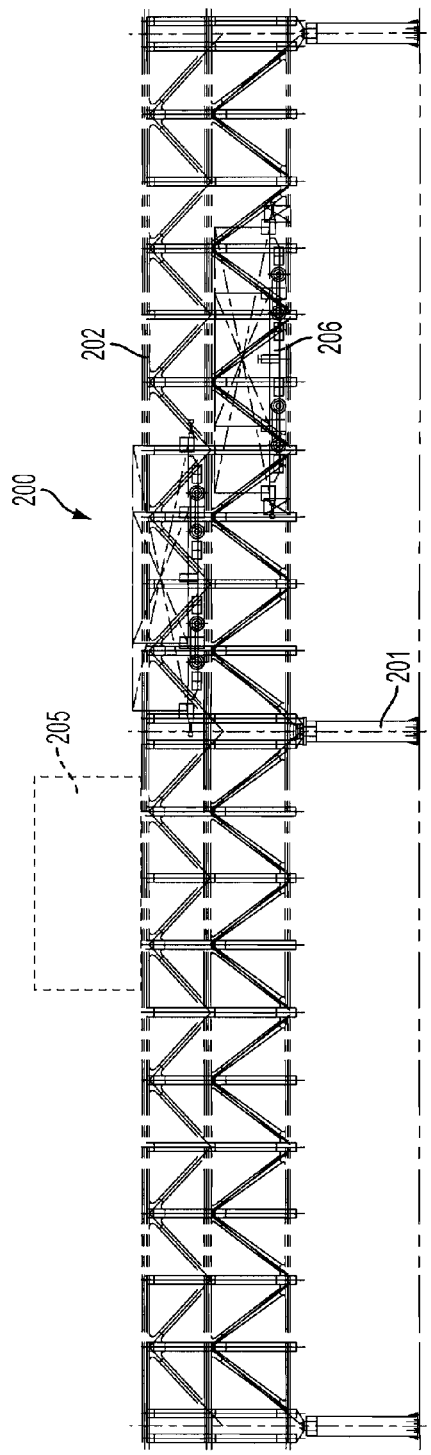
FIG. 3c is a structural diagram of a multi-tier low elevated transfer system according to an embodiment of the present invention.
Figure 3D:
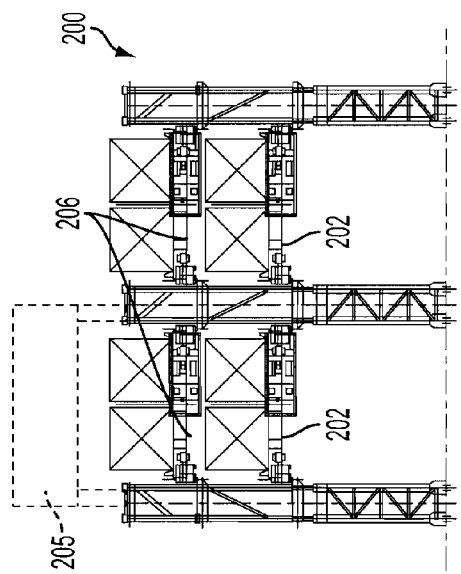
FIG. 3d is a side view of FIG. 3c, which illustrates two low elevated transfer subsystems with two tiers of low elevated rails.

Referring to FIGS. 3a, 3b and 3c, a subsystem of the low elevated transfer system 200 is illustrated. Referring to FIGS. 3a and 3b, basic components of the low elevated structure is illustrated. A series of supports 201 are arranged with a predetermined interval. A low elevated structure 202 is disposed on the supports 201 along the first direction. Rails 203 and 204 are disposed on the low elevated structure 202. As shown in FIG. 3d, a two-tier structure is shown. At least one low elevated crane is disposed on and move along each group of a low elevated crane rails 204, and at least one low elevated flat carrier is disposed and move along each group of low elevated flat carrier rails 203 (see FIG. 3a, 3b). The low elevated crane performs load/unload to the low elevated flat carrier 206 and to the ground transportation carrier 301. The low elevated flat carrier rails 203 and the low elevated crane rails 204 are configured to enable the low elevated crane 205 and the low elevated flat carrier 206 to reach a position that can cooperate with the quayside cranes and a position that can cooperate with the ground transportation carriers. As mentioned above, for a large container terminal, two low elevated flat carriers 206 may be configured on each low elevated flat carrier rail 203 and two low elevated cranes 205 may be configured on each low elevated crane rail 204.

Referring to FIGS. 3c and 3d, for sufficient utilization of the space, the low elevated transfer system 200 of the present invention can be provided with a multi-tier structure. As shown in FIG. 3d, in the low elevated structure 202, an upper tier low elevated flat carrier rail 203 and a lower tier low elevated flat carrier rail 203 is provided. One or two low elevated flat carriers 206 may be provided on each tier of the low elevated flat carrier rail so that the production efficiency can be further increased.

Generally speaking, scale of the low elevated transfer system 200, that is, the number of the low elevated transfer subsystem is determined based on the scale of the container terminal, including the number of berths in the container terminal, the number of quayside cranes and the number of yards.

In an embodiment, the low elevated transfer system 200 further includes a backup low elevated transfer subsystem. When the load/unload operation is busy, or the low elevated cranes or low elevated flat carriers on one of the low elevated transfer subsystem are failed, the backup low elevated transfer subsystem can be used to maintain the production efficiency of the whole container terminal.

Low Elevated Flat Carrier and Ground Transportation Carrier

Figure 4A:
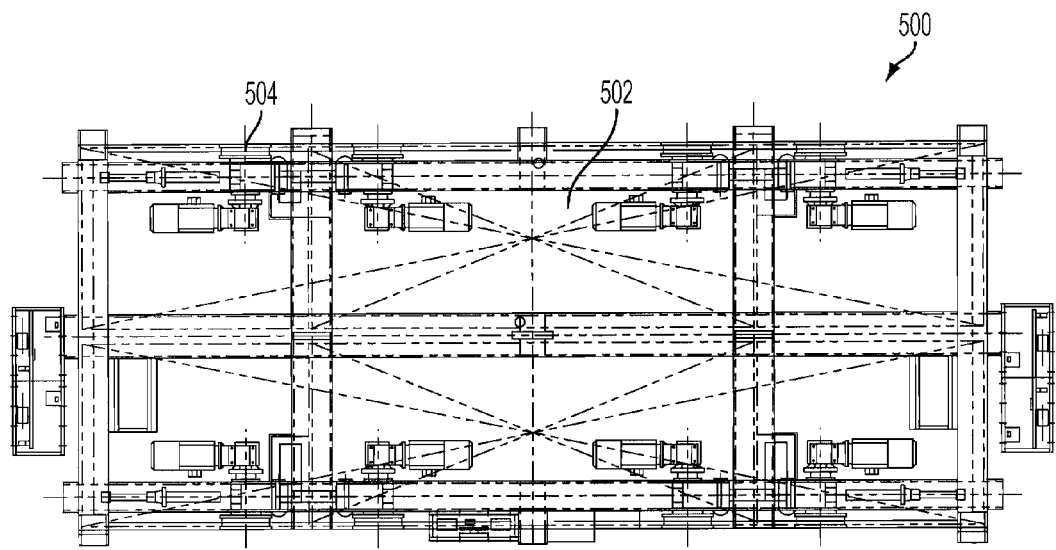
FIG. 4a is a structural diagram of a ground transportation carrier in a ground transportation carrier system according to an embodiment of the present invention.
Figure 4B:
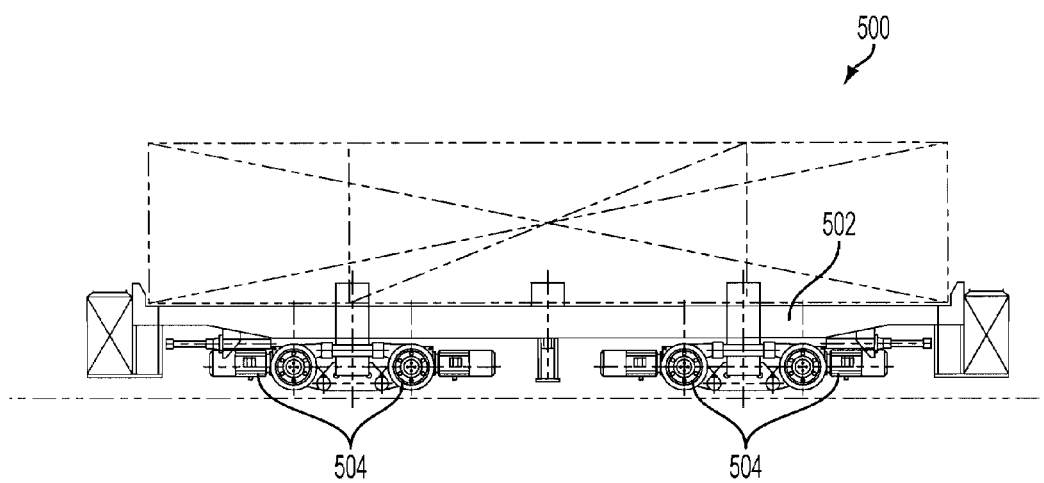

Referring to FIGS. 4a and 4b, a flat carrier according to an embodiment of the present invention is illustrated. The carrier may be used as a low elevated flat carrier 206, or a ground transportation carrier 301. The flat carrier 500 includes: a base 502, a group of wheels and a driving device 504 mounted on the base 502. The group of wheels is disposed on a group of rails and the driving device 504 drives the flat carrier 500 to move along the rails. The flat carriers of the present invention may have different driving manners, such as self-driven or traction-driven.

As mentioned above, when the flat carrier is used as a ground transportation carrier 301, it shall further have rotation ability. A rotation mechanism and a rotation plate may be provided on the flat carrier, and the rotation mechanism can rotate 90° with a container. Structure of the rotation mechanism may refer to an application with the application number 200610028895.5, which is also filed by the applicant of the present application.

Ground Transportation Carrier System

The ground transportation carrier system 300 of the present invention includes ground transportation carrier rails 302 except for the ground transportation carrier 301, which is implemented by the flat carrier 500 mentioned above. The ground transportation carrier rails 302 are in the second direction, that is, parallel to the containers in the yard. According to different schemas of container terminals, the ground transportation carrier rails 302 may extend to the yard or extend through the yard, or just extend to an end of the yard.

The ground transportation carrier system 300 connects the low elevated transfer system 200 and the yard. In a loading process, a yard crane 400 hoists the containers from the yard to a ground transportation carrier 301, the yard crane moves to a position above a ground transportation carrier 301 along a yard crane rail or the ground transportation carrier moves to a position below the yard crane along a ground transportation carrier rail 302. The ground transportation carrier rail 302 further extends to a position below the lowest low elevated structure of the low elevated transfer system 200.

In each yard, one or two groups of ground transportation carrier rails 302 may be provided according to application requirements.

Yard Crane

The yard crane 400 of the present invention may be any existent gantry crane.

As mentioned above, when the quayside crane 100 can hoist two 40 feet containers simultaneously, if would be better that all of the components in the system can process two 40 feet containers simultaneously so as to sufficiently utilize the production speed of the quayside crane 100. As mentioned above, the flat carrier 500 may have an expanded base 502 for accommodating two 40 feet containers simultaneously.

Figure 5A:
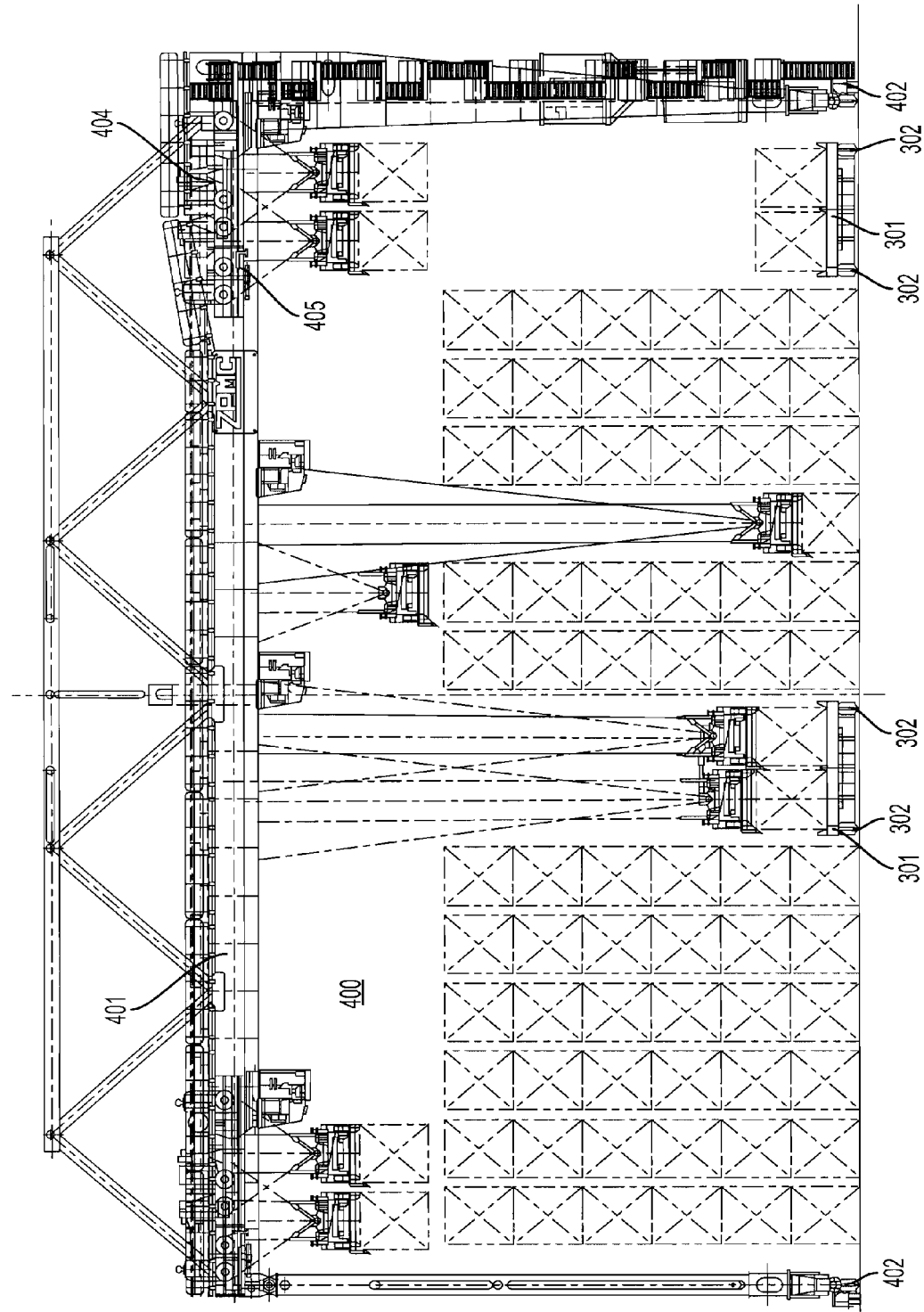
FIG. 5a is a structural diagram of a yard crane according to an embodiment of the present invention.
Figure 5B:
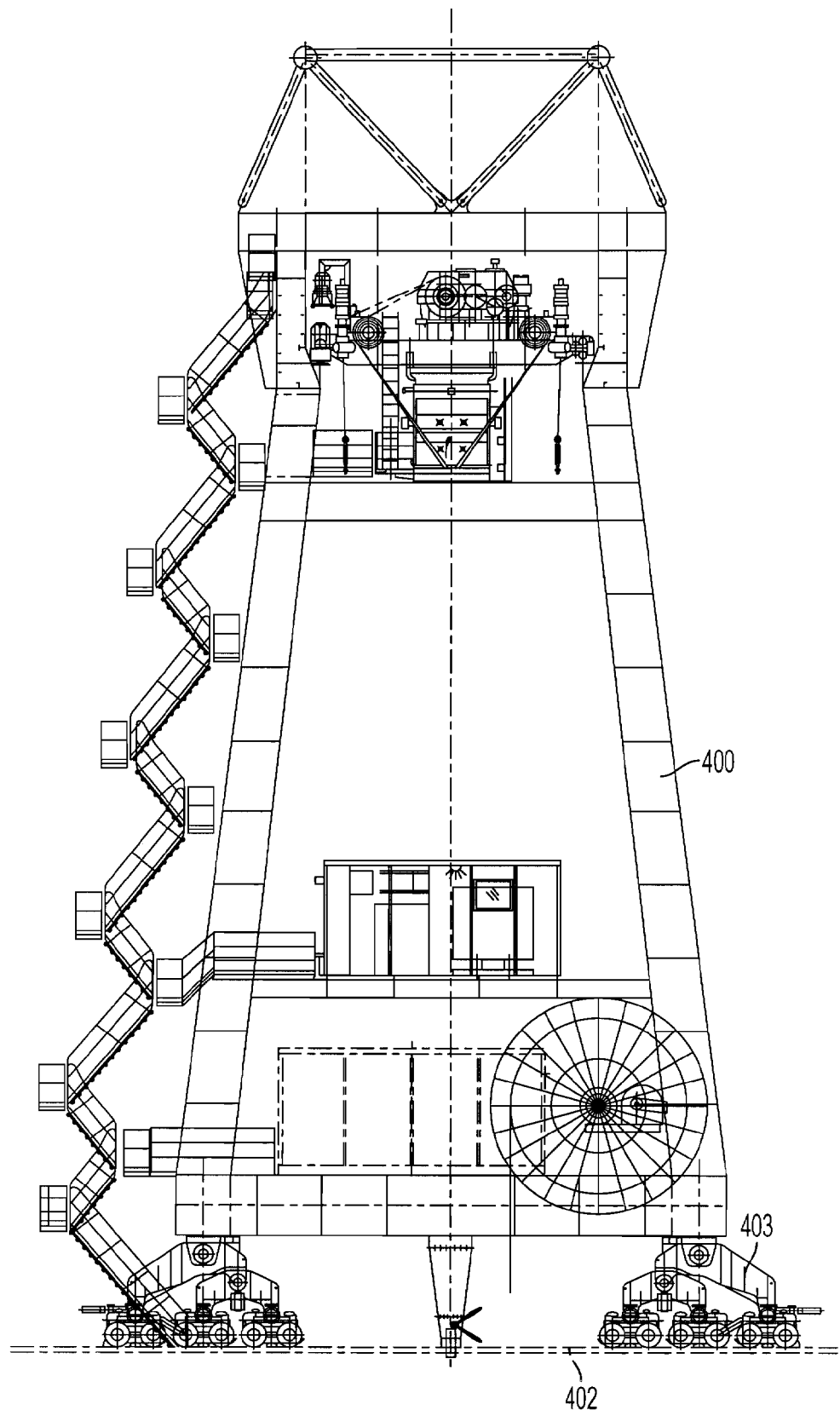

FIGS. 5a and 5b illustrates structure of a yard crane 400 according to an embodiment of the present invention. A beam 401 of the yard crane 400 crosses a plurality of ground transportation carrier rails 302 (two rails 302 are shown in FIG. 4a). A trolley 404 that can hoist two 40 feet containers simultaneously is provided on the beam 401, the trolley 404 moves along the beam 401 to put the containers to a certain position in the yard or on the ground transportation carrier. A traveling mechanism 403 is provided in the bottom of the yard crane 400, the traveling mechanism 403 enable the yard crane 400 to move along a yard crane rail 402.

Low Elevated Crane

Figure 6A:
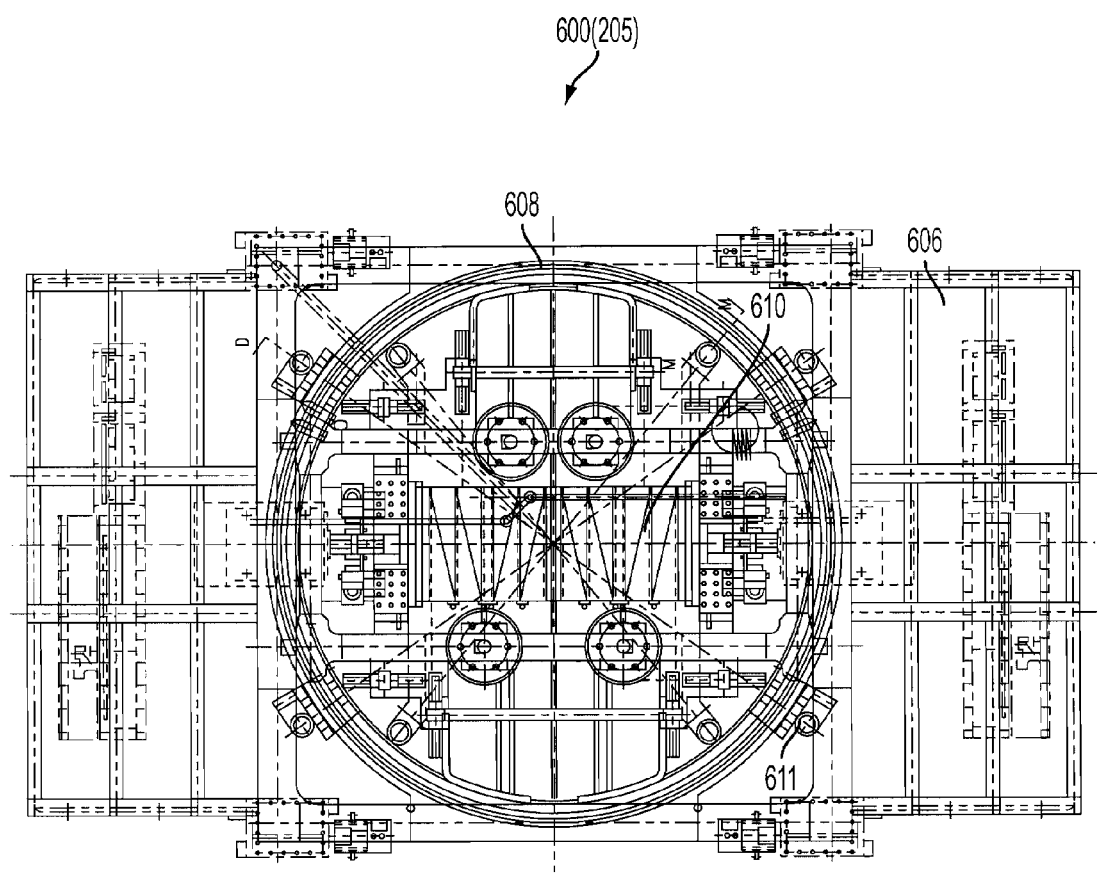
FIG. 6a is a structural diagram of a low elevated crane according to an embodiment of the present invention.
Figure 6B:
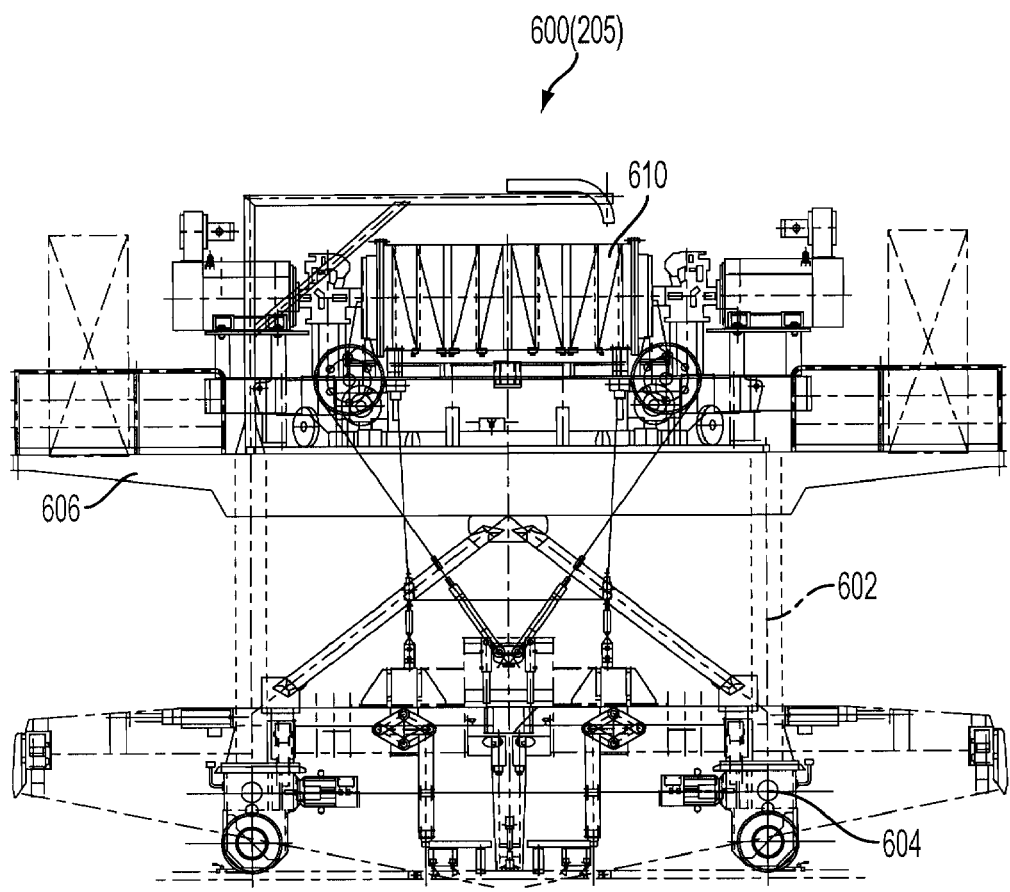
Figure 6C:
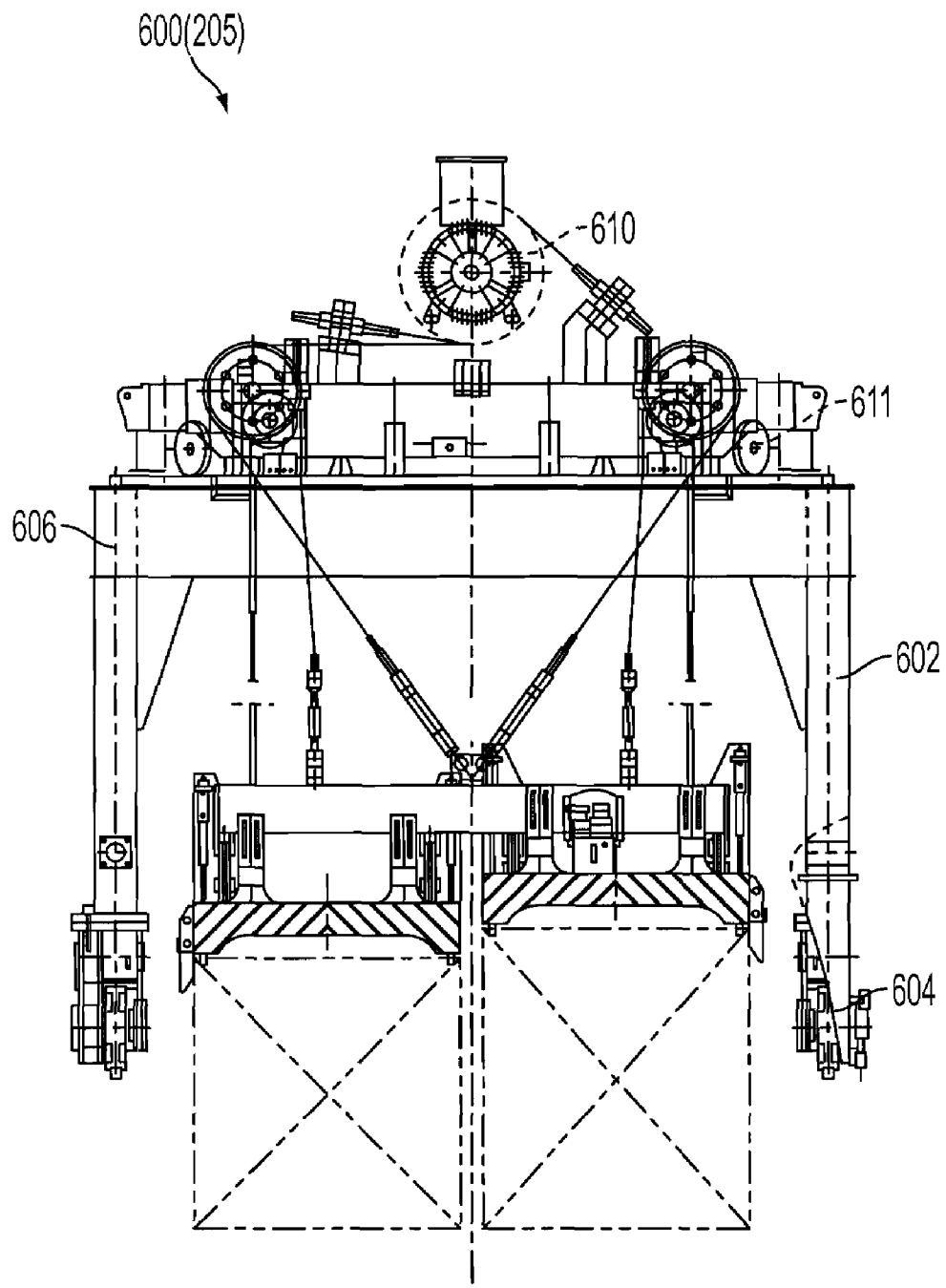
FIG. 6c is a side view of FIG. 6c from another perspective.

FIG. 6a-6c illustrates structure of the low elevated crane according to an embodiment of the present invention. The low elevated crane 600 may be used as the low elevated crane 205 in the low elevated transfer system 200. The low elevated crane 600 includes supports 602, a traveling mechanism 604 is provided below the supports 602, the traveling mechanism 604 enables the low elevates crane 600 to move along the low elevated crane rails. A platform 606 is provided above the supports 602 and a rotation plate 608 is provided on the platform 606. A hoisting mechanism 610 and a rotation mechanism 611 is provided on the rotation plate 608. The hoisting mechanism 610 may rotate together with the rotation plate 608. The hoisting mechanism 610 can hoist two 40 feet containers simultaneously, as shown in FIG. 6c. If the ground transportation carrier has rotation ability, the rotation plate 608 and the rotation mechanism 611 may be removed, and the hoisting mechanism 610 is directly mounted on the platform 606.

CONCLUSION

Embodiments of the present invention solve the problems in traditional container handling terminals, such as high pollution, high power consumption, low efficiency and difficult to implement informationization, automation. The new system provided in embodiments of the present invention uses a clean energy—electric as the power supply, which has higher profit and lower pollution than oil. The transportation of the system is three-dimensional, has a higher efficiency and needs less ground than the traditional plane transportation. The production process of the present invention can be informationized, automatized and intelligentized, which is a trend for all container handling terminals.

What is claimed is:

1. A loading/unloading system for container terminal, wherein a container yard is disposed close to the quayside and transportation of containers between the yard and a ship is realized in a three-dimensional and electric driven mode, the loading/unloading system comprising:
    quayside cranes, each comprising at least a trolley, a travelling mechanism and a hoisting mechanism, the quayside cranes operable for loading/unloading containers on/off a ship and a low elevated system at a certain position, wherein containers on the ship are arranged in a first direction, containers being loaded/unloaded by the quayside cranes are kept in the first direction, and trolleys of the quayside cranes move in a second direction perpendicular to the first direction;
    a low elevated transfer system, comprising at least one low elevated transfer subsystem, each subsystem comprising at least one group of low elevated rails disposed along the first direction, each group of low elevated rails comprising a low elevated crane rail and a plurality of low elevated flat carrier rails with a multi-tier structure, at least one low elevated crane being disposed on and moving along one low elevated crane rail, at least one low elevated flat carrier being disposed on and moving along one of the plurality of low elevated flat carrier rails with a multi-tier structure, the low elevated crane performing loading/unloading operation on a low elevated flat carrier and one of a plurality of corresponding ground transportation carriers at a certain position, the low elevated flat carrier rails being configured to enable the low elevated flat carriers to reach at least a position where the low elevated flat carriers can cooperate with trolleys of the quayside cranes and a position where the low elevated flat carriers can cooperate with the corresponding ground transportation carriers;

a ground transportation carrier system, comprising at least one group of ground transportation carrier rails disposed along the second direction in each yard, the ground transportation carrier rails aligning to passages in the yards and extending to a certain position in the yard, the transportation carrier rails also extending to a position below the lowest tier of the low elevated transfer subsystem in the low elevated transfer system, the ground transportation carrier system further comprising the plurality of ground transportation carriers moving along the ground transportation carrier rails, the ground transportation carrier rails being configured to enable the ground transportation carriers to reach at least a position where the ground transportation carriers can cooperate with the low elevated cranes and a position where the ground transportation carriers can cooperate with the yard cranes, the ground transportation carrier system further being configured to ensure that the ground transportation carriers are not in a same plane with any low elevated flat carriers on any tier of the low elevated transfer system, the ground transportation carrier having an ability to rotate to an angle between the first direction and the second direction with or without a container;

yard cranes, each comprising at least a trolley, a travelling mechanism and a hoisting mechanism, the yard cranes operable for loading/unloading containers on/off a yard and ground transportation carriers, the yard cranes being disposed on yard crane rails that are arranged along the second direction, containers in the yard being arranged along the second direction, the yard cranes moving along the yard crane rails, the yard crane rails being configured to enable the yard cranes to reach at least a position where the yard cranes can cooperate with ground transportation carriers and a position where the yard cranes can cooperate with the yard;

when loading the containers to the ship, a yard crane hoists a container in the second direction from a yard, the yard crane moves to a position above a ground transportation carrier or the ground transportation carrier moves to a position below the yard crane along a ground transportation carrier rail, the yard crane puts the container onto the ground transportation carrier and the ground transportation carrier moves along the ground transportation carrier rail to a position below a low elevated rail of the low elevated transfer system, the ground transportation carrier rotates the container from the second direction to the first direction, the low elevated crane hoists the container from the ground transportation carrier to a low elevated flat carrier, the low elevated flat carrier moves along the low elevated flat carrier rail to a position below a quayside crane, the quayside crane hoists the container from the low elevated flat carrier to the ship;

when unloading the containers from the ship, a quayside crane hoists a container in the first direction from a ship and puts the container onto a low elevated flat carrier, the low elevate flat carrier moves along a low elevated flat carrier rail to a position that can cooperate with a ground transportation carrier, a low elevated crane hoists the container to a ground transportation carrier, the ground transportation carrier rotates the container from the first direction to the second direction, the ground transportation carrier moves along a ground transportation carrier rail to a yard, a yard crane hoists the container from the ground transportation carrier to the yard; and wherein the low elevated crane includes supports, a traveling mechanism, a platform, a rotation, a hoisting mechanism and a rotation mechanism, the traveling mechanism is provided below the supports and enables the low elevates crane to move along the low elevated crane rails, the platform is provided above the supports and the rotation plate is provided on the platform, the hoisting mechanism and the rotation mechanism is provided on the rotation plate, the hoisting mechanism rotates together with the rotation plate, wherein the hoisting mechanism and the rotation plate are able to rotate to an angle between the first direction and the second direction with or without a container, when loading the containers to the ship the hoisting mechanism and the rotation plate rotate the container from the second direction to the first direction, when unloading the containers from the ship the hoisting mechanism and the rotation plate rotate the container from the first direction to the second direction; wherein the hoisting mechanism is configured for hoisting two 40 feet containers simultaneously.

2. The system of claim 1, wherein the number of the low elevated transfer subsystem is determined based on the number of berths in the container terminal, the number of quayside cranes and the number of yards.

3. The system of claim 2, wherein two low elevated flat carriers are disposed on each low elevated flat carrier rail in a low elevated transfer subsystem for transporting containers in different areas;

the low elevated flat carriers and low elevated flat carrier rails in each low elevated transfer subsystem are constructed to have a plurality of tiers.

4. The system of claim 2, wherein two low elevated cranes are disposed on each low elevated crane rail in a low elevated transfer subsystem.

5. The system of claim 2, wherein the low elevated transfer system further comprises a backup low elevated transfer system.

6. The system of claim 1, wherein the quayside crane can be all kinds of quayside cranes, especially a quayside crane that hoists two 40 feet containers simultaneously;

the yard crane can be all kinds of yard cranes, especially a yard crane that hoists two 40 feet containers simultaneously.

7. The system of claim 1, wherein the quayside cranes, the low elevated cranes, the low elevated flat carriers, the ground transportation carriers and the yard cranes are powered by municipal electricity.

8. The system of claim 1, wherein further comprises:
rear yard cranes, configured to load/unload with trucks.

9. The system of claim 1, wherein for special containers, the quayside cranes load/unload them with container trucks within a gauge of the rails of the quayside cranes.

10. A loading/unloading system for a container terminal, comprising:
a plurality of quayside cranes having trolleys and being operable for loading/unloading containers on and off a ship, wherein the containers on the ship are arranged in a first direction;
a low elevated transfer system, including:
a low elevated crane rail arranged along the first direction;
a low elevated crane disposed on and moveable along the low elevated crane rail and having a hoisting mechanism and a rotation plate, the hoisting mechanism being rotatable together with the rotation plate to an angle between the first direction and a second direction perpendicular to the first direction with or without a container, the hoisting mechanism being further configured for hoisting two 40 feet containers simultaneously;

a plurality of low elevated flat carrier rails having a multi-tier structure and being arranged along the first direction, the multi-tier structure having a lowest tier;

a low elevated flat carrier being disposed on and moveable along one of the plurality of low elevated flat carrier rails with a multi-tier structure; and wherein the low elevated crane is configured to perform loading and unloading of the low elevated flat carrier and the low elevated flat carrier rails are configured to enable the low elevated flat carrier to reach at least a position where the low elevated flat carrier can cooperate with the trolleys of the plurality of quayside cranes;

a ground transportation carrier system including:

a plurality of ground transportation carrier rails disposed along the second direction perpendicular to the first direction and extending to a position below the lowest tier of the low elevated transfer subsystem;

a ground transportation carrier moveable along the ground transportation carrier rails; and wherein the plurality of ground transportation rails are configured to enable the ground transportation carriers to reach at least a position where the ground transportation carriers can cooperate with the low elevated crane and to ensure that the ground transportation carriers are not in a same plane with any low elevated flat carriers on any tier of the low elevated transfer system, the ground transportation carrier having an ability to rotate to an angle between the first direction and the second direction with or without a container; and a plurality of yard cranes operable for loading and unloading containers on and off a yard and the ground transportation carrier, the plurality of yard cranes being disposed on yard crane rails that are arranged along the second direction, the yard crane rails being configured to enable the plurality of yard cranes to reach at least a position where the yard cranes can cooperate with the ground transportation carrier and a position where the plurality of yard cranes can cooperate with the yard.

\* \* \* \* \*